United States Patent
Pearl

(10) Patent No.: US 11,334,410 B1
(45) Date of Patent: May 17, 2022

(54) DETERMINING ABERRANT MEMBERS OF A HOMOGENOUS CLUSTER OF SYSTEMS USING EXTERNAL MONITORS

(71) Applicant: INTUIT INC., Mountain View, CA (US)

(72) Inventor: Michael Pearl, Mountain View, CA (US)

(73) Assignee: INTUIT INC., Mountain View, CA (US)

(*) Notice: Subject to any disclaimer, the term of this patent is extended or adjusted under 35 U.S.C. 154(b) by 106 days.

(21) Appl. No.: 16/517,839

(22) Filed: Jul. 22, 2019

(51) Int. Cl.
 *G06F 11/00* (2006.01)
 *G06F 11/07* (2006.01)

(52) U.S. Cl.
 CPC ...... *G06F 11/0754* (2013.01); *G06F 11/0709* (2013.01); *G06F 11/0793* (2013.01)

(58) Field of Classification Search
 CPC ............ G06F 11/0709; G06F 11/0754; G06F 11/0793
 See application file for complete search history.

(56) References Cited

U.S. PATENT DOCUMENTS

| | | | | |
|---|---|---|---|---|
| 7,076,695 B2* | 7/2006 | McGee | ............. | G06F 11/0709 702/179 |
| 8,527,814 B1* | 9/2013 | Elwell | ................ | G06F 11/0793 714/38.1 |
| 9,223,672 B1* | 12/2015 | Honton | ................ | G06Q 10/101 |
| 9,378,112 B2* | 6/2016 | Banerjee | ............. | G06F 11/3409 |
| 9,860,140 B2* | 1/2018 | Vasseur | ................... | H04L 43/02 |
| 10,015,184 B1* | 7/2018 | Bell | ..................... | H04L 63/1425 |
| 10,409,662 B1* | 9/2019 | Young | .................... | G06F 11/079 |
| 10,747,188 B2* | 8/2020 | Yoshida | ............. | G05B 23/0243 |
| 10,931,548 B1* | 2/2021 | Iyer | ......................... | H04L 43/06 |
| 2013/0268805 A1* | 10/2013 | Lee | ..................... | G06F 11/3409 714/15 |
| 2016/0153806 A1* | 6/2016 | Ciasulli | .................... | G01D 3/08 702/184 |
| 2018/0285750 A1* | 10/2018 | Purushothaman | ..... | G06N 5/045 |
| 2018/0314576 A1* | 11/2018 | Pasupuleti | .......... | G06F 11/3089 |
| 2019/0129788 A1* | 5/2019 | Fields | ................. | G06F 11/0754 |
| 2019/0370610 A1* | 12/2019 | Batoukov | ........... | G06F 11/0793 |
| 2020/0042373 A1* | 2/2020 | Przestrzelski | ....... | G06F 11/0751 |
| 2020/0073740 A1* | 3/2020 | Ohana | ................... | G06F 11/079 |
| 2020/0341833 A1* | 10/2020 | Poghosyan | ......... | G06F 11/0712 |

* cited by examiner

*Primary Examiner* — Jonathan D Gibson
(74) *Attorney, Agent, or Firm* — Patterson + Sheridan, LLP

(57) ABSTRACT

Certain aspects of the present disclosure provide techniques for detecting and preventing failures in a cluster of systems. Embodiments include receiving a set of performance metrics from each respective system of the cluster of systems. Embodiments include determining a score for each respective system of the cluster of systems based on the set of performance metrics received from the respective system. Embodiments include comparing the score for each respective system of the cluster of systems to a threshold. Embodiments include identifying, based on the comparing, an aberrant system of the cluster of systems. Embodiments include performing a remedial action on the aberrant system.

20 Claims, 5 Drawing Sheets

US 11,334,410 B1

DETERMINING ABERRANT MEMBERS OF A HOMOGENOUS CLUSTER OF SYSTEMS USING EXTERNAL MONITORS

INTRODUCTION

Aspects of the present disclosure relate to techniques for determining aberrant members of homogenous clusters of systems. In particular, embodiments described herein involve using external monitors to determine aberrant systems.

BACKGROUND

Computing applications are sometimes deployed on a homogenous cluster of computing systems. A homogenous cluster of computing systems generally refers to a plurality of physical or virtual machines of the same type that work together to perform related operations. Systems in a cluster are generally connected to each other through high-speed local area networks, with each system running its own instance of an operating system. In a homogenous cluster, all of the systems use the same types and/or amounts of hardware resources and the same operating system. For example, a homogenous cluster of systems may be used for performance testing of an application. Clusters are often used for high performance computing applications where a large amount of processing power is needed.

When a system in a cluster fails, it may become necessary to take remedial action. For example, a system that has failed may need to be restarted, replaced, or otherwise attended to. A virtual machine that has failed, for example, may need to be shut down and restarted or replaced in the cluster. However, waiting until a system fails to take remedial action can lead to interruptions in processing, lost data, or a decrease in efficiency.

Hence, there is a need for improved techniques for detecting and preventing failures in homogenous clusters of systems.

BRIEF SUMMARY

Certain embodiments provide a method for detecting and preventing failures in a cluster of systems. The method generally includes: receiving a set of performance metrics from each respective system of the cluster of systems; determining a score for each respective system of the cluster of systems based on the set of performance metrics received from the respective system; comparing the score for each respective system of the cluster of systems to a threshold; identifying, based on the comparing, an aberrant system of the cluster of systems; and performing a remedial action on the aberrant system.

Other embodiments provide a non-transitory computer-readable medium comprising instructions that, when executed by one or more processors of a computing system, cause the computing system to perform a method for detecting and preventing failures in a cluster of systems. The method generally includes receiving a set of performance metrics from each respective system of the cluster of systems; determining a score for each respective system of the cluster of systems based on the set of performance metrics received from the respective system; comparing the score for each respective system of the cluster of systems to a threshold; identifying, based on the comparing, an aberrant system of the cluster of systems; and performing a remedial action on the aberrant system.

Other embodiments provide a system comprising one or more processors and a non-transitory computer-readable medium comprising instructions that, when executed by the one or more processors, cause the system to perform a method for detecting and preventing failures in a cluster of systems. The method generally includes receiving a set of performance metrics from each respective system of the cluster of systems; determining a score for each respective system of the cluster of systems based on the set of performance metrics received from the respective system; comparing the score for each respective system of the cluster of systems to a threshold; identifying, based on the comparing, an aberrant system of the cluster of systems; and performing a remedial action on the aberrant system.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
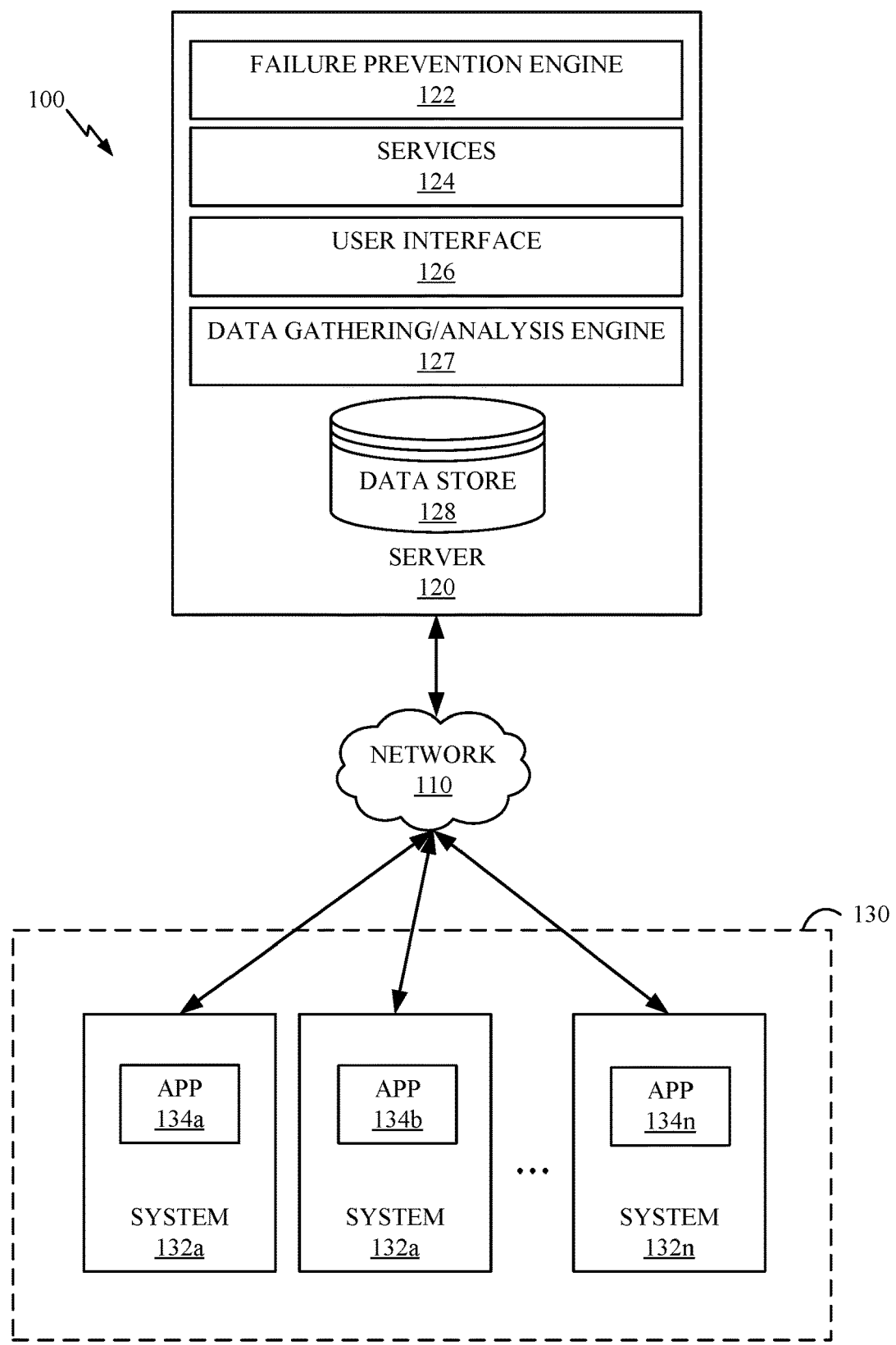
FIG. 1 depicts an example computing environment in which embodiments of the present disclosure may be implemented.

Aspects of the present disclosure provide apparatuses, methods, processing systems, and computer readable mediums for detecting and preventing failures in a cluster of systems.

Techniques described herein involve gathering metrics from systems in a cluster and processing the metrics in particular ways to detect, prevent, and/or correct failures within the cluster. For example, a homogenous cluster of systems (e.g., a plurality of physical or virtual machines of the same type that work together to perform related operations) may be used for performance testing of an application. In one embodiment, each system of the cluster performs the same or similar operations in order to test performance of a particular application. A server may gather performance metrics from each system in the cluster, such as using a metrics collection service, at regular intervals. For instance, a set of metrics, such as: processor utilization, network bytes in, network bytes out, and context switches per second, may be gathered from each system. In some embodiments, the sets of metrics are collected over time as time-series data, such as metric values associated with time intervals. The server processes the sets of metrics in order to determine scores for the systems in the cluster.

In one example, the server analyzes the sets of metrics in order to determine the average value for each metric across the cluster of systems and the standard deviation of each metric across the cluster of systems. Then, for a given system, the server analyzes each respective metric of the set of metrics corresponding to the given system to determine its relationship to the average value of that metric. The server may, for instance, determine how many standard deviations from the average value the respective metric is. The server may determine a number of standard deviations from the average value for each metric of the set of metrics for the given system, and may then add the absolute value of each of these numbers together in order to determine the score for the given system. For instance, scores may be "z scores," which generally represent a number of standard deviations away from an average value. An objective of the scores is to recognize outlying members of a cluster. A score of a system generally indicates how close to average (e.g., for the cluster) a system's overall performance is, with low scores indicating close to average values and high scores indicating far from average values. It is noted that this is included as one example, and other techniques for determining scores may be used. In some embodiments, the server provides the sets of metrics to one or more local or remote services that process the metrics in order to determine the scores for each system. In certain embodiments, the server determines a score for each time interval included in time-series data representing the values of metrics over time.

The server may compare the scores for each system in the cluster to a threshold in order to determine whether the system is an aberrant system. An aberrant system generally refers to a system exhibiting unusual characteristics, such as performance that departs a threshold amount from an average value or range. For example, in some embodiments, a threshold is set to be a number that is consistently associated with system failures. System failures may refer to cases where systems crash or otherwise become inoperable, and records of historical system failures may include various performance metrics that were recorded using a monitoring tool prior the historical system failures. In one example, the threshold is set to ten because systems with a score above ten (e.g., for a time interval) are identified as likely to fail. The score may be calculated in a uniform manner (e.g., by determining a number of standard deviations from the average value for each metric of the set of metrics for a given system, and adding the absolute value of each of these numbers together) so that it always falls within a certain range of values, and the threshold may be determined based on the expected range. The threshold may be determined in advance by a professional based on metrics associated with historical system failures or may be automatically determined based on analysis of historical metrics associated with system failures.

In one embodiment, a professional reviews metrics associated with historical system failures, calculates scores for the systems that failed, and determines the threshold based on these scores, such as by determining a value that all system's scores exceeded for a certain time interval prior to failing. In another embodiment, an automated system analyzes metrics associated with historical system failures and determines the threshold based on scores of the systems that failed. For example, the automated system may identify trends indicating that systems with scores above a certain value for a certain time interval historically failed.

Upon determining that a score for a system has exceeded the threshold, such as for a given period of time (e.g., the score has been above ten for ten minutes), the server may determine that the system is an aberrant system (e.g., that it has failed or is likely to fail soon), and may initiate one or more remedial actions for the system. For example, the server may initiate a shut-down process or a restart process on the aberrant system. If the system is a virtual machine, the server may restart or kill and replace the virtual machine.

The server may alternatively or additionally generate a visualization of the sets of metrics and/or the scores, and may display the visualization to a user via a user interface. The visualization may, for instance, be generated using a visualization service. For example, the visualization may allow users to identify aberrant systems so that they can take remedial action. The server may, in some embodiments, notify the user that a system has been determined to be an aberrant system.

While certain techniques described herein involve performing particular operations in order to determine scores, other embodiments may involve the use of machine learning techniques. For example, similarly to the way in which thresholds may be automatically determined, a predictive model may be trained using historical metrics associated with system failures so that the predictive model can output a prediction of whether a system is aberrant based on input metrics from the system. The predictive model may, for instance, be able to detect aberrant systems sooner than other techniques based on associations between metric patterns and values over particular periods of time and historical system failures.

Advantageously, techniques described herein allow aberrant systems to be identified and addressed quickly, thereby saving costs, avoiding lost data and downtime, and improving reliability within a homogeneous cluster of systems.

Example Computing Environment

FIG. 1 illustrates an example computing environment 100 in which embodiments of the present disclosure may be implemented.

Computing environment 100 includes a server 120 that communicates with a homogenous cluster 130 of systems 132a-n over a network 110 in order to enable detecting and preventing failures in cluster 130.

Server 120 is representative of a computing device, such as a rack server or desktop computer. Server 120 includes failure prevention engine 122, which performs operations related to detecting and preventing failures in a cluster of systems. For instance, failure prevention engine 122 may receive metrics from systems 132a-n and perform operations related to calculating scores for each of systems 132a-n in order to identify aberrant systems and take remedial action. In alternative embodiments described in more detail below with respect to FIG. 3, failure prevention engine 122 uses machine learning techniques to identify aberrant systems in cluster 130 and take remedial action.

Server 120 further includes services 124, which may comprise a plurality of computing applications that perform various operations. For example, services 124 may include metric gathering and analysis services, data storage, organization, and retrieval services, data visualization services, and other types of services. In one example, services 124 include a plurality of services such as Telgraf (open source), APACHE® PARQUET™, WAVEFRONT® by VMWARE®, and AMAZON WEB SERVICES® (AWS) S3, AWS® Athena, AWS® Glue, and AWS® Kinesis. It is noted that, while services 124 are depicted on server 120, one or more of services 124 may alternatively be implemented remotely, such as in a "cloud" service.

Server 120 further includes a user interface 126, which provides output (e.g., via a display associated with server 120) to and receives input (e.g., through keyboards, mice, touch-sensitive devices, and/or the like) from users. For example, failure prevention engine 122 may provide visualizations of metrics and scores related to detecting and preventing failures to user interface 126 for display to users.

Server 120 further includes data gathering/analysis engine 127, which generally gathers and analyzes data from systems 132a-n, such as via applications 134a-n. In some embodiments, data gathering/analysis engine 127 receives metrics associated with historical system failures that were captured via applications 134a-n, and analyzes the metrics, such as by calculating scores for the systems, to determine score thresholds associated with failures. In certain embodiments, data gathering/analysis engine 127 uses metrics associated with historical system failures to train a machine learning model for predicting system failures, as described in more detail below with respect to FIG. 3.

Server 120 further includes data store 124, which represents one or more data storage entities that store data related to failure prevention engine 122, services 124, and user interface 126. In some embodiments, data store 124 stores metrics collected from systems 132a-n and scores determined by failure prevention engine 122 for systems 132a-n.

Cluster 130 of systems 132a-n comprises a homogenous cluster of systems that perform related operations, such as for performance testing of an application or for distribution and/or providing redundancy of data and processing. Each of systems 132a-n generally represents a computing device, such as a rack server, desktop computer, or virtual computing instance (e.g., virtual machine executing with resources allocated from a physical computing device). Systems 132a-n comprise applications 134a-n that may perform various operations related to data gathering and remedial actions on systems 132a-n. For instance, apps 134a-n may be client-side companion applications that correspond to failure prevention engine 122 and/or data gathering analysis engine 127. Applications 134a-n may also comprise user interface components. In certain embodiments, applications 134a-n comprise instances of Telgraf for metric collection.

In certain embodiments, failure prevention engine 122 receives metrics gathered from each systems 132a-n (e.g., using a metric collection service of services 124 and/or one or more services running on systems 132a-n, such as applications 134a-n) and uses the metrics to identify whether any of systems 132a-n are aberrant. For example, in one embodiment, failure prevention engine 122 uses a set of metrics received from each system of systems 132a-n to calculate a score for the system and then uses the score to determine whether the system is an aberrant system. Upon determining that a system is an aberrant system, failure prevention engine 122 may take remedial action such as shutting down or restarting the system (e.g., which may involve interaction with applications 134a-n). Determining scores based on metrics and taking remedial action are described in more detail below with respect to FIG. 2.

Figure 2:
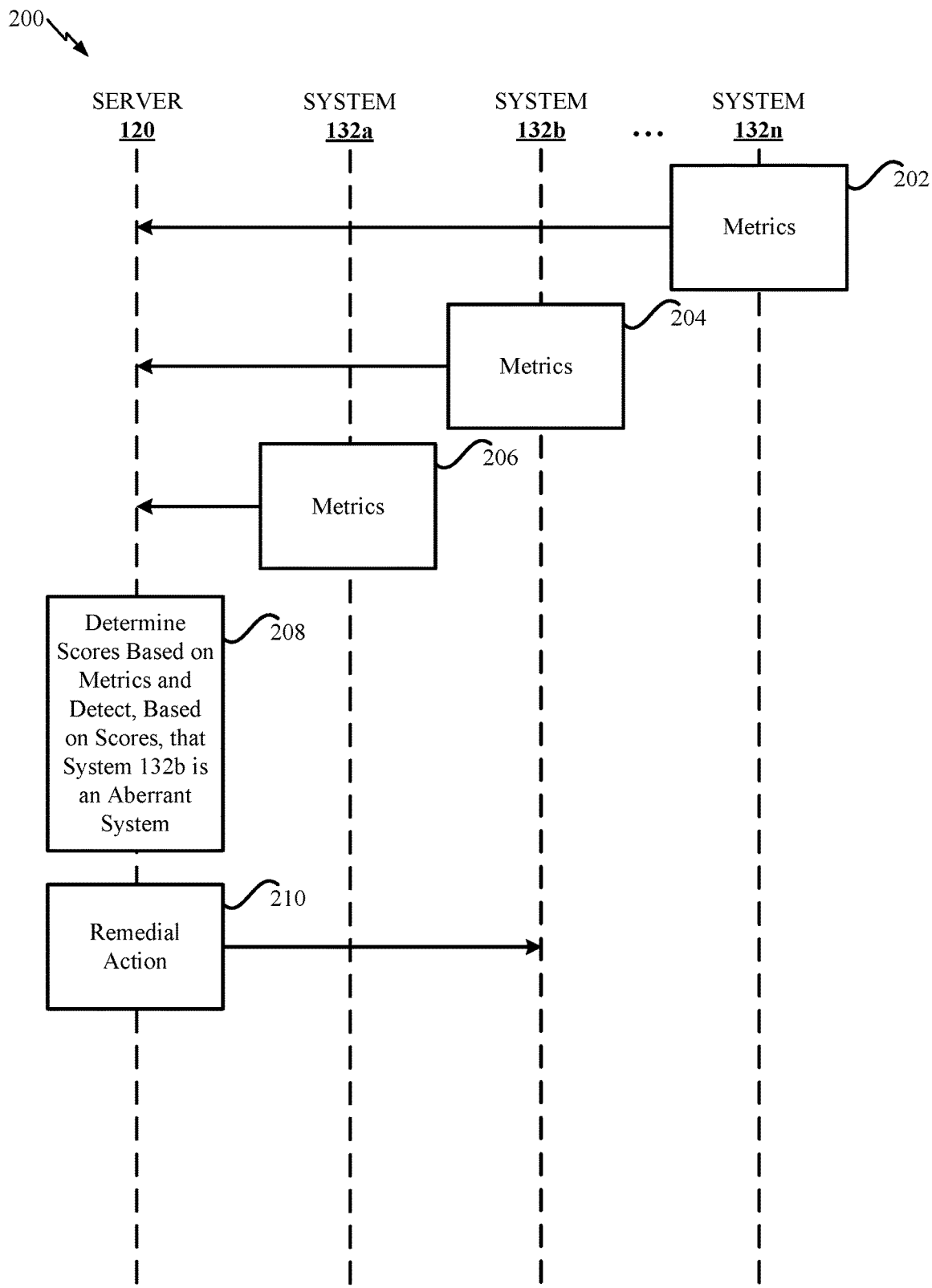
FIG. 2 depicts an example exchange of messages between components related to detecting and preventing failures in a homogenous cluster of systems.

Example Exchange of Messages for Detecting and Preventing Failures in a Cluster of Systems FIG. 2 depicts an example 200 of an exchange of messages between components related to detecting and preventing failures in a cluster of systems, including server 120 and systems 132a-n of FIG. 1.

At 202, 204, and 206, server 120 receives metrics from systems 132a-n. For example, a metrics collection service may be used to collect a set of performance metrics from each of systems 132a-n, such as processor utilization, network bytes in, network bytes out, and number of context switches. A context switch occurs whenever the currently running task encounters something that causes it to pause, such as when it is waiting on I/O from network or storage, and the OS determines that there is another task that can be performed by the OS in the meantime. A context switch generally involves CPU time to clear out the registers and cache that the previous task's process/thread used as the OS starts/resumes work on a different task. The metrics may be collected over time, such as at regular intervals or on a rolling basis. For example, metrics may be collected in one minute intervals from each of systems 132a-n. While some embodiments involve "pulling" the metrics by server 120 from systems 132a-n, other embodiments involve "pushing" the metrics by systems 132a-n to server 120. In some embodiments, applications 134a-n running on systems 132a-n collect the metrics and send them to server 120.

In one example, a "basicstats" aggregator function of Telgraf is modified to write metrics to an AWS® Kinesis stream, the Kinesis stream is written to S3 in an Apache Parquet file format, and AWS® Athena is then used to query metrics from S3.

Telegraf is an open-source product that can collect metrics used for techniques described herein from multiple operating systems. AWS® Kinesis is an effective tool for handling streaming data. Parquet is a database-friendly filesystem format that is useful for processing tabular data, including compression, and is writeable from Kinesis. Athena provides a useful mechanism for querying metrics. These services are only included as examples, and other techniques may be used to collect metrics from systems 132a-n.

At 208, server 120 determines scores for each of systems 132a-n based on the metrics received at 202, 204, and 206, and then detects, based on the scores that system 132b is an aberrant system. In some embodiments, scores are calculated based on metrics collected in rolling windows (e.g., rolling fifteen minute time windows), and aberrant systems are identified based on systems with scores that exceed a threshold for a certain amount of time. In one example, server 120 determines scores based on standard deviations of the metrics.

In one example, server 120 determines an average value and a standard deviation of each metric of the set of metrics (e.g., processor utilization, network bytes in, network bytes out, and number of context switches) across systems 132a-n for each time interval (e.g., for each one-minute period within a time-series in the metrics). Then for a given system (e.g., system 132b), server 120 determines how many standard deviations away from the average value each metric of the set of metrics is for the system for each time interval. In one example, for a time interval across systems 132a-n, the average processor utilization is 40 percent and the standard deviation of processor utilization is 5. If system 132b has a processor utilization of 60 percent for the time interval, then processor utilization for the system 132b for the time interval is 4 standard deviations (e.g., 4×5) away from the average value. The absolute value of this number (e.g., 4) may be taken so that regardless of whether the metric is below or above the average value, an accurate representation of the distance from the average value can be attained.

The same process may be used to determine an absolute value of a number for each metric of the set of metrics for system 132b for each time interval, and then all of these absolute values may be added together to determine a score for system 132b for the time interval. For example, the absolute values of numbers of standard deviations from the average values for numbers of network bytes in, numbers of network bytes out, and numbers of context switches for system 132*b* may be 2, 6, and 0. Adding each of these to the number for processor utilization (4), discussed above, results in a score of 12 for system 132*b* for the time interval. While adding is included as one example, other aggregation techniques may be used to determine the score, such as averaging.

The server 120 may compare the score for each system 132*a-n* for each time interval to a threshold to identify aberrant systems. For example, the threshold may be set to the predetermined value of 10 and a time threshold may also be set to the predetermined value of 5 minutes, meaning that any system with a score greater than 10 for more than 5 minutes is identified as an aberrant system. In the example above, the score for system 132*b* for the time interval was 12. If the score remained above 10 for five 1-minute time intervals, then server 120 would identify system 132*b* as an aberrant system. It is noted that the values included herein are only included as examples, and different values may alternatively be used. Furthermore, some embodiments may include comparing scores to a threshold without considering time intervals to identify aberrant systems (e.g., if a system has a score greater than 20 at any point, then the system may be identified as an aberrant system).

At 210, server 120 performs a remedial action for system 132*b*. For example, having identified system 132*b* as an aberrant system at 208, server 120 may initiate a shut-down or restart process for system 132*b*. For example, server 120 may access system 132*b* using credentials of system 132*b* provided to server 120, such as by an administrator, and initiate a shut-down or restart process. In some cases, application 134*b* on system 132*b* allows server 120 to access system 132*b*, such as via remote desktop techniques or another remote access techniques. In one embodiment, if system 132*b* is a virtual machine, server 120 may kill system 132*b* and replace system 132 with a new virtual machine. Killing and replacing a virtual machine may be a more effective way to ensure that a problem is resolved than simply restarting the virtual machine, as some types of problems may persist through a restart. In other embodiments, server 120 may notify a user that system 132*b* is an aberrant system so that the user can take remedial action.

In some embodiments, server 120 further generates a visualization based on the metrics, the scores (e.g., with respect to time intervals), and/or identifications of systems as aberrant, and displays the visualization to a user via a user interface. For example, server 120 may use a visualization service to generate the visualization.

In alternative embodiments, rather than determining scores in order to identify aberrant systems, server 120 uses machine learning techniques to identify aberrant systems. Machine learning techniques are described in more detail below with respect to FIG. 3.

Example Machine Learning Techniques

Figure 3:
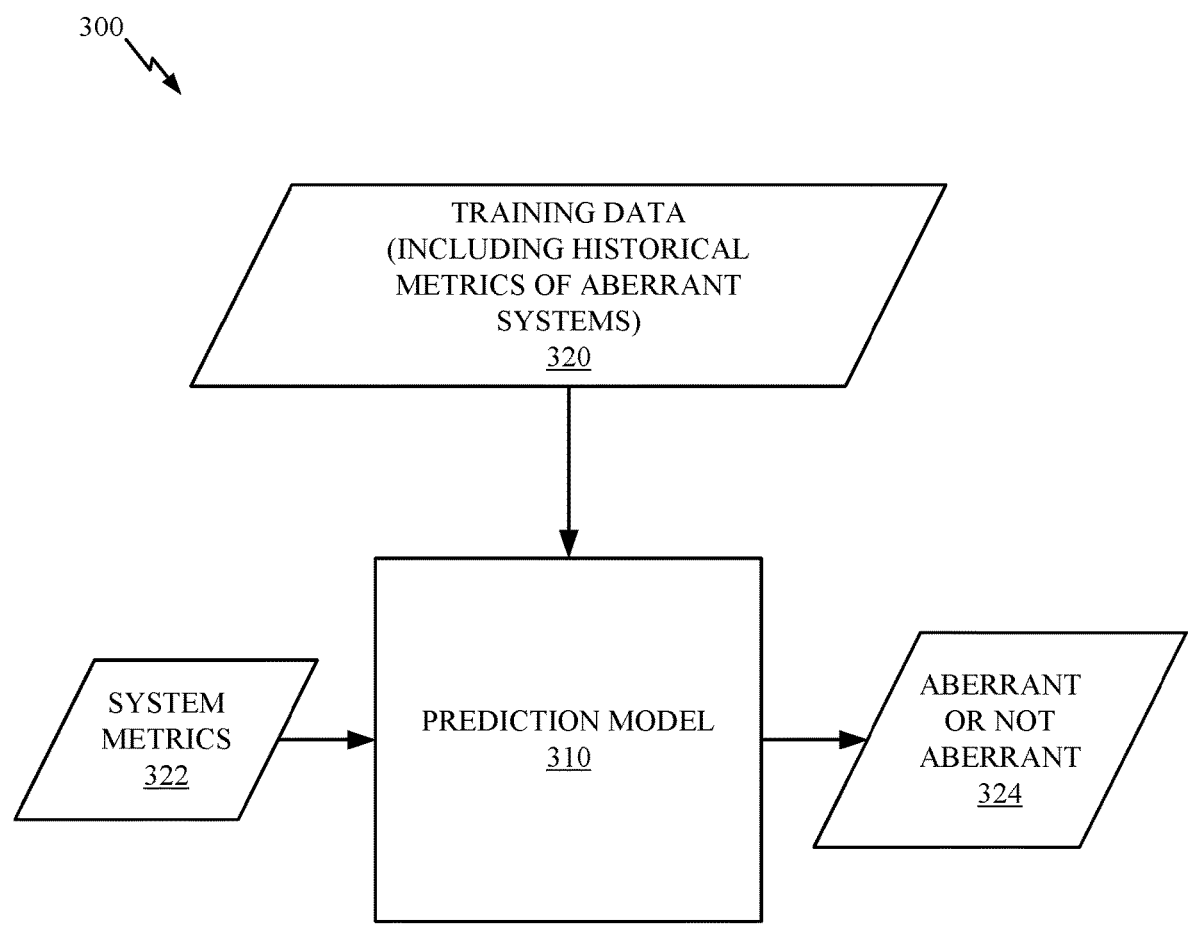
FIG. 3 depicts an example prediction model for detecting and preventing failures in a homogenous cluster of systems.

FIG. 3 depicts an example 300 of machine learning techniques for detecting and preventing failures in a cluster of systems. Example 300 may, for instance, be performed by failure prevention engine 122 of FIG. 1.

Machine-learning models allow computing systems to improve and refine functionality without explicitly being programmed. Given a set of training data, a machine-learning model can generate and refine a function that determines a target attribute value based on one or more input features. For example, if a set of input features describes an automobile and the target value is the automobile's gas mileage, a machine-learning model can be trained to predict gas mileage based on the input features, such as the automobile's weight, tire size, number of cylinders, coefficient of drag, and engine displacement.

The predictive accuracy a machine-learning model achieves ultimately depends on many factors. Ideally, training data for the machine-learning model should be representative of the population for which predictions are desired (e.g., unbiased and correctly labeled). In addition, training data should include a large number of training instances relative to the number of features on which predictions are based and relative to the range of possible values for each feature.

In example 300, a prediction model 310 is trained using training data 320, which includes historical metrics of aberrant systems. For example, the historical metrics may have been collected over time from various systems in clusters of systems, and may include processor utilization, network bytes in, network bytes out, and numbers of context switches per second, as just a few examples. Historical metrics of systems determined to be aberrant (e.g., based on techniques described herein or based on failures, such as crashes, of the systems) are used as training data 320. In some embodiments, historical metrics of systems determined not to be aberrant are also used in training data 320.

For instance, training data 320 may comprise a plurality of training data instances, each instance including a set of input "features" (e.g., metric values, in some instances corresponding to time intervals) associated with a "label" (e.g., aberrant or not aberrant).

Prediction model 310 may be, for instance, a random forest classifier, and training prediction model 310 may involve building a "forest" of "trees" representing training data 320, where input features are randomly permuted at each split (e.g., each division of training data 320). In such embodiments, prediction model 310 is "trained" by constructing a plurality of decision trees based on sub-divisions of training data 320 that include random permutations of input features associated with labels. It is noted that random forest techniques are only included as one example, and that other techniques may be employed for training prediction model 310.

Other types of traditional machine learning models such as a Naïve Bayes classification model, logistic regression, decision tree, gradient-boosted tree, neural networks, and others may also be used as a prediction model 310.

A Naïve Bayes classification model is based on the concept of dependent probability i.e., what is the chance of some outcome given some other outcome.

A logistic regression model takes some inputs and calculates the probability of some outcome, and the label may be applied based on a threshold for the probability of the outcome. For example, if the probability is >50% then the label is A, and if the probability is <=50%, then the label is B.

A decision tree makes a classification by dividing the inputs into smaller classifications (at nodes), which result in an ultimate classification at a leaf. Gradient boosting is a method for optimizing decision-tree based models.

Neural networks generally include a collection of connected units or nodes called artificial neurons, which loosely model the neurons in a biological brain. The operation of neural networks can be modeled as an iterative process. Each node has a particular value associated with it. In each iteration, each node updates its value based upon the values of the other nodes, the update operation typically consisting of a matrix-vector multiplication. The update algorithm reflects the influences on each node of the other nodes in the network.

Once trained, prediction model 310 is able to predict whether a system is aberrant or not aberrant based on input metrics from the system. For instance, system metrics 322 may comprise values for a set of metrics collected from a system (e.g., system 132b of FIGS. 1 and 2). In some embodiments, system metrics 322 include metric values associated with time intervals. System metrics 322 are provided as inputs (e.g., input features) to prediction model 310. Prediction model 310 then outputs a prediction 324 of whether the system is aberrant or not aberrant based on system metrics 322. Prediction 324 may then be used by failure prevention engine 122 of FIG. 1 to determine whether to take remedial action. For example, if prediction 324 predicts that system 132b of FIGS. 1 and 2 is aberrant, then failure prevention engine 122 of FIG. 1 may initiate a restart or shut-down operation for system 132b.

It is noted that the particular techniques, inputs, and outputs described with respect to example 300 are not limiting, and other types of machine learning processes may be used. For instance, in alternative embodiments, training data 320 may include scores determined for aberrant systems, and prediction model 310 may be trained to predict whether a system is aberrant based on scores.

Figure 4:
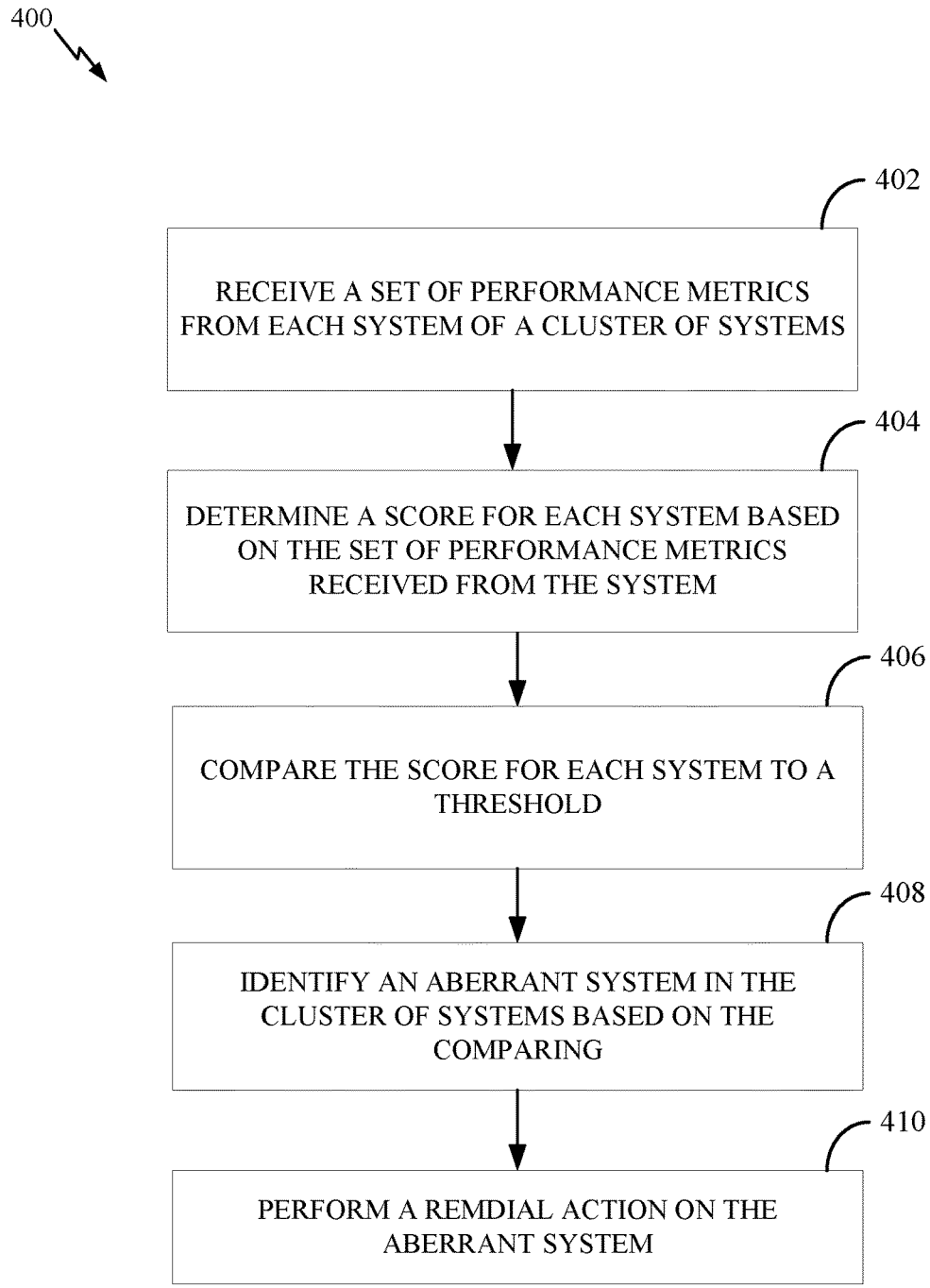
FIG. 4 depicts example operations for detecting and preventing failures in a homogenous cluster of systems.

FIG. 4 depicts example operations 400 for detecting and preventing failures in a cluster of systems. For example, operations 400 may be performed by failure prevention engine 122 of FIG. 1.

At step 402, a set of performance metrics is received from each system of a cluster of systems. For example, failure prevention engine 122 of FIG. 1 may receive the sets of performance metrics from a metric collection service that aggregates performance metrics from systems 132a-n in cluster 130 of FIG. 1. Each set of metrics may include values associated with time intervals. The sets of metrics may include, for instance, a processor utilization amount, a total number of network bytes in, a total number of network bytes out, and a number of context switches per second.

At step 404 a score is determined for each system based on the set of performance metrics received from the system. For example, failure prevention engine 122 of FIG. 1 may determine the score for a given system for each time interval included in the set of metrics by adding together the absolute value of the number of standard deviations each metric value is from the average value for that metric (e.g., for the time interval). In other embodiments, failure prevention engine 122 of FIG. 1 uses a scoring service to determine the scores. Failure prevention engine 122 of FIG. 1 may determine a score for each system for each time interval.

At step 406, the score for each system is compared to a threshold. For example, failure prevention engine 122 of FIG. 1 may determine whether or not the score for each system has exceeded the threshold for a threshold amount of time.

At step 408, an aberrant system is identified in the cluster of systems based on the comparing at step 406. For example, if a system has a score that exceeds the threshold for a threshold amount of time (e.g., a score above 10 for 10 minutes), failure prevention engine 122 of FIG. 1 may identify the system as an aberrant system.

At step 410, a remedial action is performed on the aberrant system. For example, failure prevention engine 122 of FIG. 1 may initiate a shut-down or restart process for the aberrant system.

In some examples, failure prevention engine 122 of FIG. 1 may also generate one or more visualizations based on the sets of metrics, the scores, and/or identifications of systems as aberrant. For example, failure prevention engine 122 of FIG. 1 may use a visualization service to generate a visualization, and may display the visualization to a user via a user interface.

Example Computing System

Figure 5:
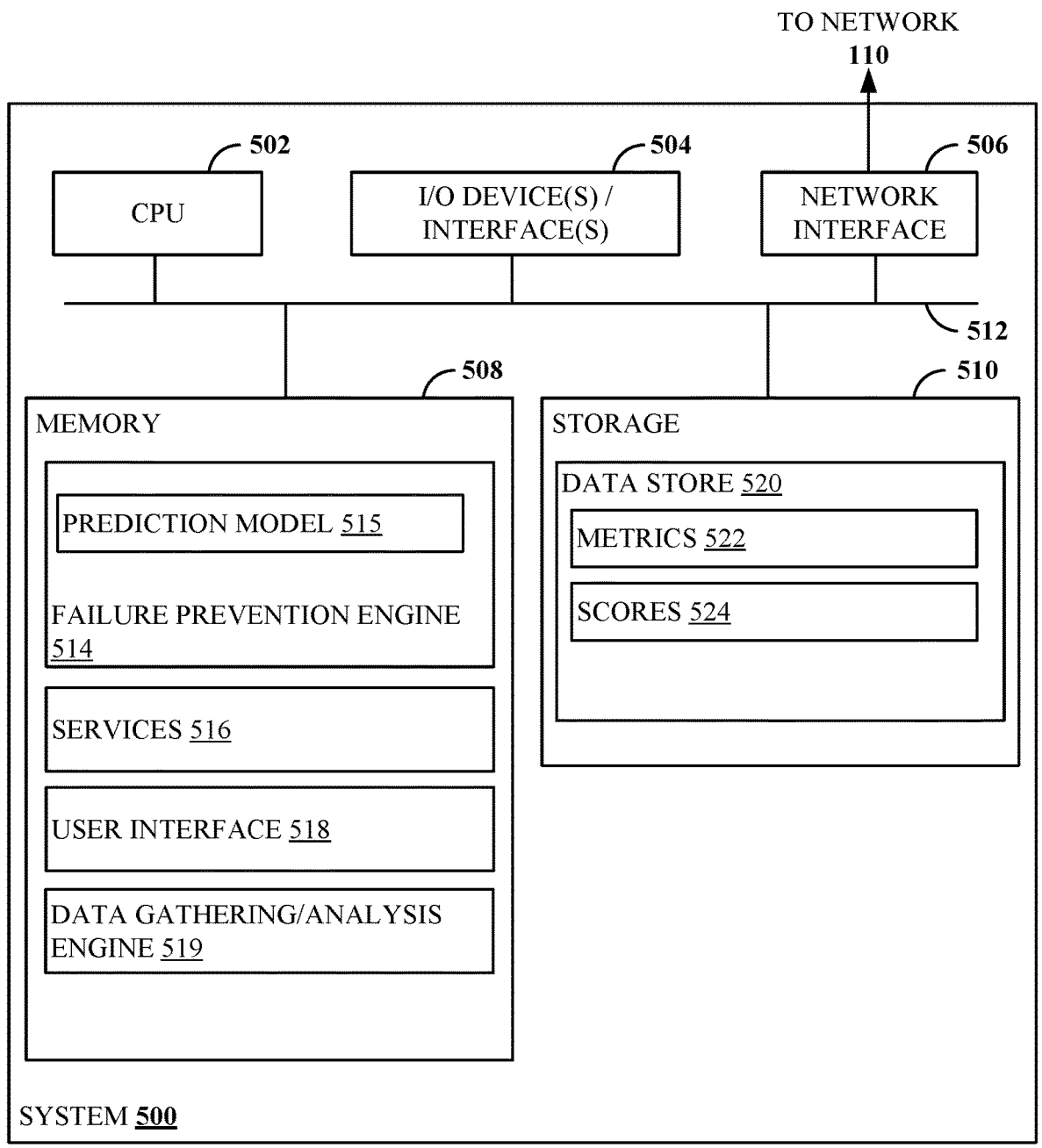
FIG. 5 depicts an example computer system with which embodiments of the present disclosure may be implemented.

FIG. 5 illustrates an example system 500 used for detecting and preventing failures in a homogenous cluster of systems. For example, system 500 may be representative of server 120 of FIG. 1.

System 500 includes a central processing unit (CPU) 502, one or more I/O device interfaces 504 that may allow for the connection of various I/O devices 514 (e.g., keyboards, displays, mouse devices, pen input, etc.) to the system 500, network interface 506, a memory 508, storage 510, and an interconnect 512. It is contemplated that one or more components of system 500 may be located remotely and accessed via a network. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and other arrangements.

Additionally, the memory 508 is included to be representative of a random access memory.

Storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

Storage 510 comprises data store 520, which may be representative of data store 128 of FIG. 1. While data store 520 is depicted in local storage of system 500, it is noted that data store 520 may also be located remotely (e.g., at a location accessible over a network, such as the Internet). Data store 520 includes metrics 522 (e.g., values of metrics associated with time intervals collected from systems of a cluster of systems) and scores 524 (e.g., determined based on metrics 522 by failure prevention engine 514 as described herein).

As shown, memory 508 includes failure prevention engine 514 services 516, user interface 518, and data gathering/analysis engine 519, which may be representative of failure prevention engine 122, services 124, user interface 126, and data gathering/analysis engine 127 of FIG. 1. Failure prevention engine 514 comprises prediction model 515, which may be representative of prediction model 310 of FIG. 3.

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for detecting and preventing failures in a plurality of computing devices, comprising:
   receiving a set of performance metrics for a first time period for each respective computing device of the plurality of computing devices;
   determining a score for the first time period for a computing device of the plurality of computing devices based on comparing the set of performance metrics for the computing device of the plurality of computing devices to a set of average performance metrics for the first time period across the plurality of computing devices;
   comparing the score for the computing device of the plurality of computing devices to a threshold;
   identifying, based on the comparing, the computing device as an aberrant computing device for the first time period of the plurality of computing devices; and
   performing a remedial action on the aberrant computing device of the plurality of computing devices, wherein the remedial action comprises one of:
     initiating a shut-down process for the aberrant computing device of the plurality of computing devices; or
     initiating a restart process for the aberrant computing device of the plurality of computing devices.

2. The method of claim 1, wherein identifying, based on the comparing, the aberrant computing device of the plurality of computing devices comprises determining that the score for the aberrant computing device of the plurality of computing devices exceeds the threshold for a duration of the first time period.

3. The method of claim 1, wherein determining the score for the computing device of the plurality of computing devices based on the set of performance metrics for the computing device of the plurality of computing devices comprises providing the set of performance metrics for the computing device of the plurality of computing devices to a service, wherein the score is determined based on an output from the service.

4. The method of claim 1, wherein receiving the set of performance metrics for each respective computing device of the plurality of computing devices comprises receiving one or more values selected from:
   a processor utilization amount;
   a total number of network bytes in;
   a total number of network bytes out; or
   a number of context switches per second.

5. The method of claim 1, wherein the threshold was determined based on automated analysis of scores of computing devices that historically failed.

6. The method of claim 1, further comprising:
   generating a visualization based on a respective score for each respective computing device of the plurality of computing devices; and
   displaying the visualization to a user via a user interface.

7. The method of claim 1, wherein comparing the set of performance metrics for the computing device of the plurality of computing devices to the set of average performance metrics across the plurality of computing devices comprises:
   determining the set of average performance metrics for the first time period across the plurality of computing devices; and
   determining a set of distances for the first time period between the set of performance metrics and the set of average performance metrics, wherein the score for the computing device of the plurality of computing devices comprises a sum of each distance in the set of distances.

8. A non-transitory computer-readable medium comprising instructions that, when executed by one or more processors of a computing system, cause the computing system to perform a method for detecting and preventing failures in a plurality of computing devices, the method comprising:
   receiving a set of performance metrics for a first time period for each respective computing device of the plurality of computing devices;
   determining a score for the first time period for a computing device of the plurality of computing devices based on comparing the set of performance metrics for the computing device of the plurality of computing devices to a set of average performance metrics for the first time period across the plurality of computing devices;
   comparing the score for the computing device of the plurality of computing devices to a threshold;
   identifying, based on the comparing, the computing device as an aberrant computing device for the first time period of the plurality of computing devices; and performing a remedial action on the aberrant computing device of the plurality of computing devices, wherein the remedial action comprises one of:
- initiating a shut-down process for the aberrant computing device of the plurality of computing devices; or
- initiating a restart process for the aberrant computing device of the plurality of computing devices.

9. The non-transitory computer-readable medium of claim 8, wherein identifying, based on the comparing, the aberrant computing device of the plurality of computing devices comprises determining that the score for the aberrant computing device of the plurality of computing devices exceeds the threshold for a duration of the first time period.

10. The non-transitory computer-readable medium of claim 8, wherein determining the score for the computing device of the plurality of computing devices based on the set of performance metrics for the computing device of the plurality of computing devices comprises providing the set of performance metrics for the computing device of the plurality of computing devices to a service, wherein the score is determined based on an output from the service.

11. The non-transitory computer-readable medium of claim 8, wherein receiving the set of performance metrics for each respective computing device of the plurality of computing devices comprises receiving one or more values selected from:
- a processor utilization amount;
- a total number of network bytes in;
- a total number of network bytes out; or
- a number of context switches per second.

12. The non-transitory computer-readable medium of claim 8, wherein the threshold was determined based on automated analysis of scores of computing devices that historically failed.

13. The non-transitory computer-readable medium of claim 8, wherein the method further comprises:
- generating a visualization based on a respective score for each respective computing device of the plurality of computing devices; and
- displaying the visualization to a user via a user interface.

14. The non-transitory computer-readable medium of claim 8, wherein comparing the set of performance metrics for the computing device of the plurality of computing devices to the set of average performance metrics across the plurality of computing devices comprises:
- determining the set of average performance metrics for the first time period across the plurality of computing devices; and
- determining a set of distances for the first time period between the set of performance metrics and the set of average performance metrics, wherein the score for the computing device of the plurality of computing devices comprises a sum of each distance in the set of distances.

15. A system, comprising one or more processors and a non-transitory computer-readable medium comprising instructions that, when executed by the one or more processors, cause the system to:
- receive a set of performance metrics for a first time period for each respective computing device of a plurality of computing devices;
- determine a score for the first time period for a computing device of the plurality of computing devices based on comparing the set of performance metrics for the computing device of the plurality of computing devices to a set of average performance metrics for the first time period across the plurality of computing devices;
- compare the score for the computing device of the plurality of computing devices to a threshold;
- identify, based on whether the score for the computing device exceeds the threshold, the computing device as an aberrant computing device for the first time period of the plurality of computing devices; and
- perform a remedial action on the aberrant computing device of the plurality of computing devices, wherein the remedial action comprises one of:
  - initiating a shut-down process for the aberrant computing device of the plurality of computing devices; or
  - initiating a restart process for the aberrant computing device of the plurality of computing devices.

16. The system of claim 15, wherein in order to identify the aberrant computing device of the plurality of computing devices, the one or more processors are further configured to cause the system to determine that the score for the aberrant computing device of the plurality of computing devices exceeds the threshold for a duration of the first time period.

17. The system of claim 15, wherein in order to determine the score for the computing device of the plurality of computing devices based on the set of performance metrics for the computing device of the plurality of computing devices, the one or more processors are further configured to cause the system to provide the set of performance metrics for the computing device of the plurality of computing devices to a service, wherein the score is determined based on an output from the service.

18. The system of claim 15, wherein in order to receive the set of performance metrics for each respective computing device of the plurality of computing devices, the one or more processors are further configured to cause the system to receive one or more values selected from:
- a processor utilization amount;
- a total number of network bytes in;
- a total number of network bytes out; or
- a number of context switches per second.

19. The system of claim 15, wherein the threshold was determined based on automated analysis of scores of computing devices that historically failed.

20. The system of claim 15, wherein in order to compare the set of performance metrics for the computing device of the plurality of computing devices to the set of average performance metrics across the plurality of computing devices, the one or more processors are further configured to cause the system to:
- determine the set of average performance metrics for the first time period across the plurality of computing devices; and
- determine a set of distances for the first time period between the set of performance metrics and the set of average performance metrics, wherein the score for the computing device of the plurality of computing devices comprises a sum of each distance in the set of distances.

* * * * *